April 26, 1932.   I. S. MOSHER   1,856,042
DOUGH CUTTER
Filed March 5, 1931   6 Sheets-Sheet 6
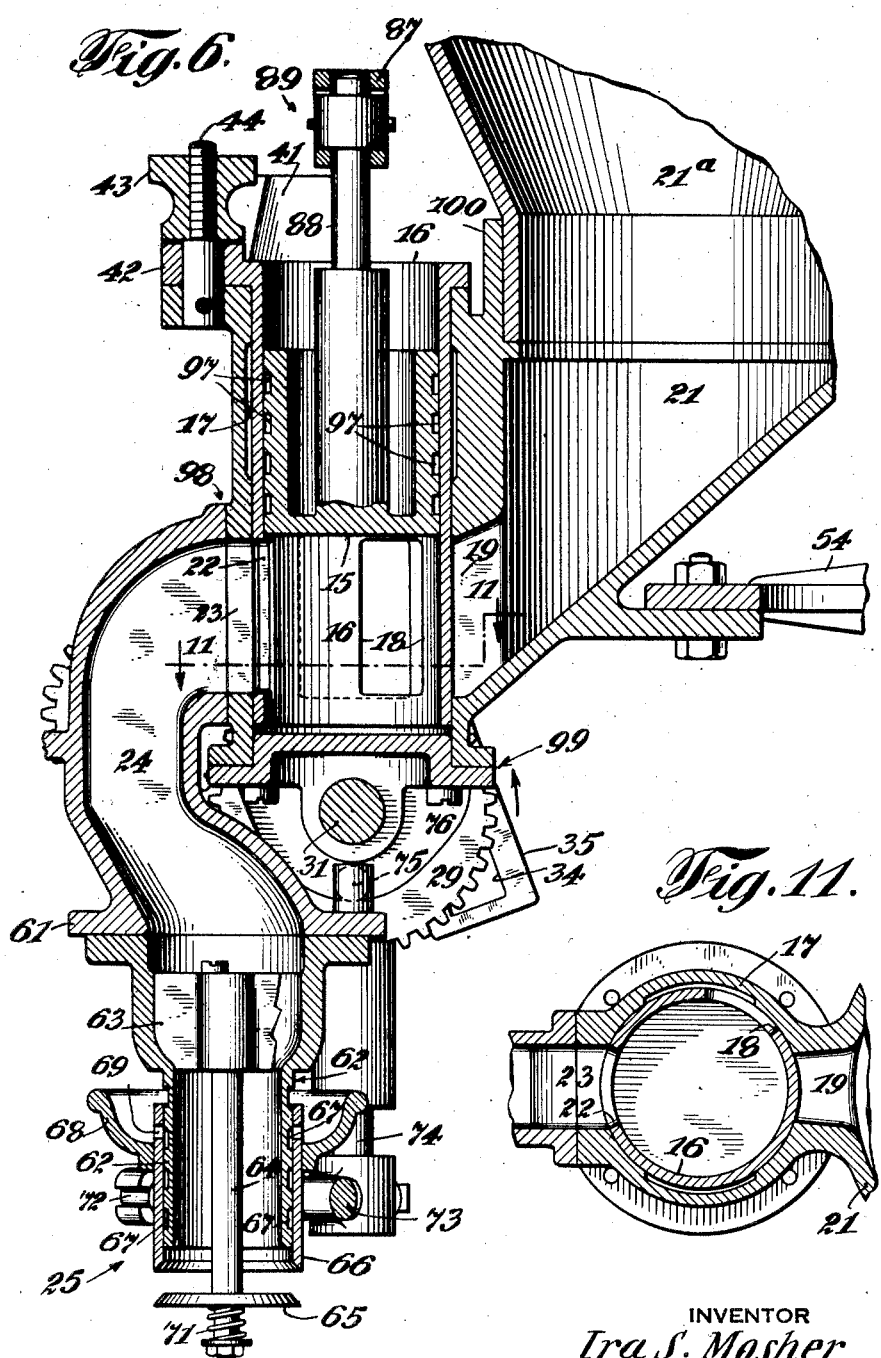
INVENTOR
Ira S. Mosher
BY Ramsey & Kent
his ATTORNEYS Patented Apr. 26, 1932

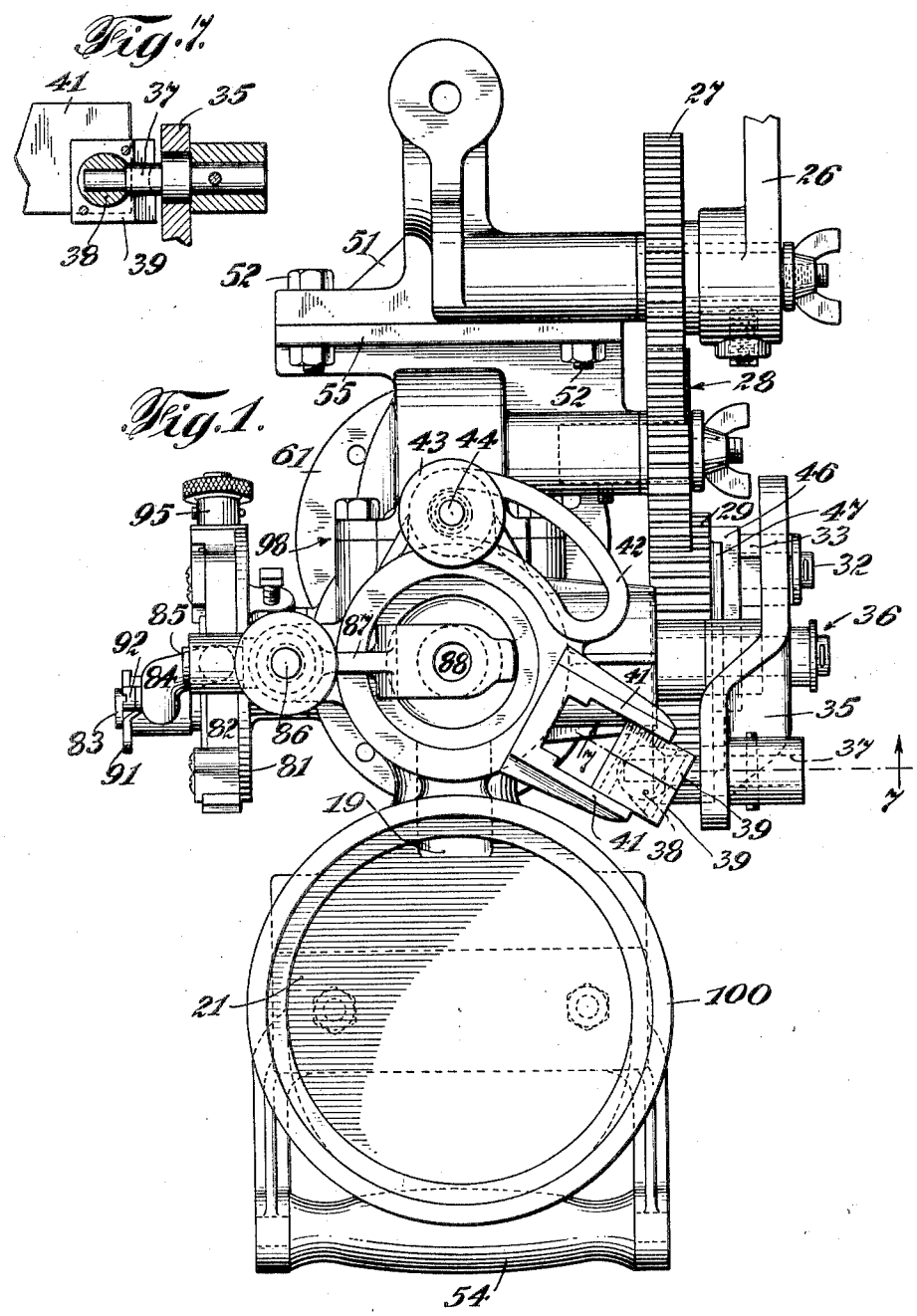

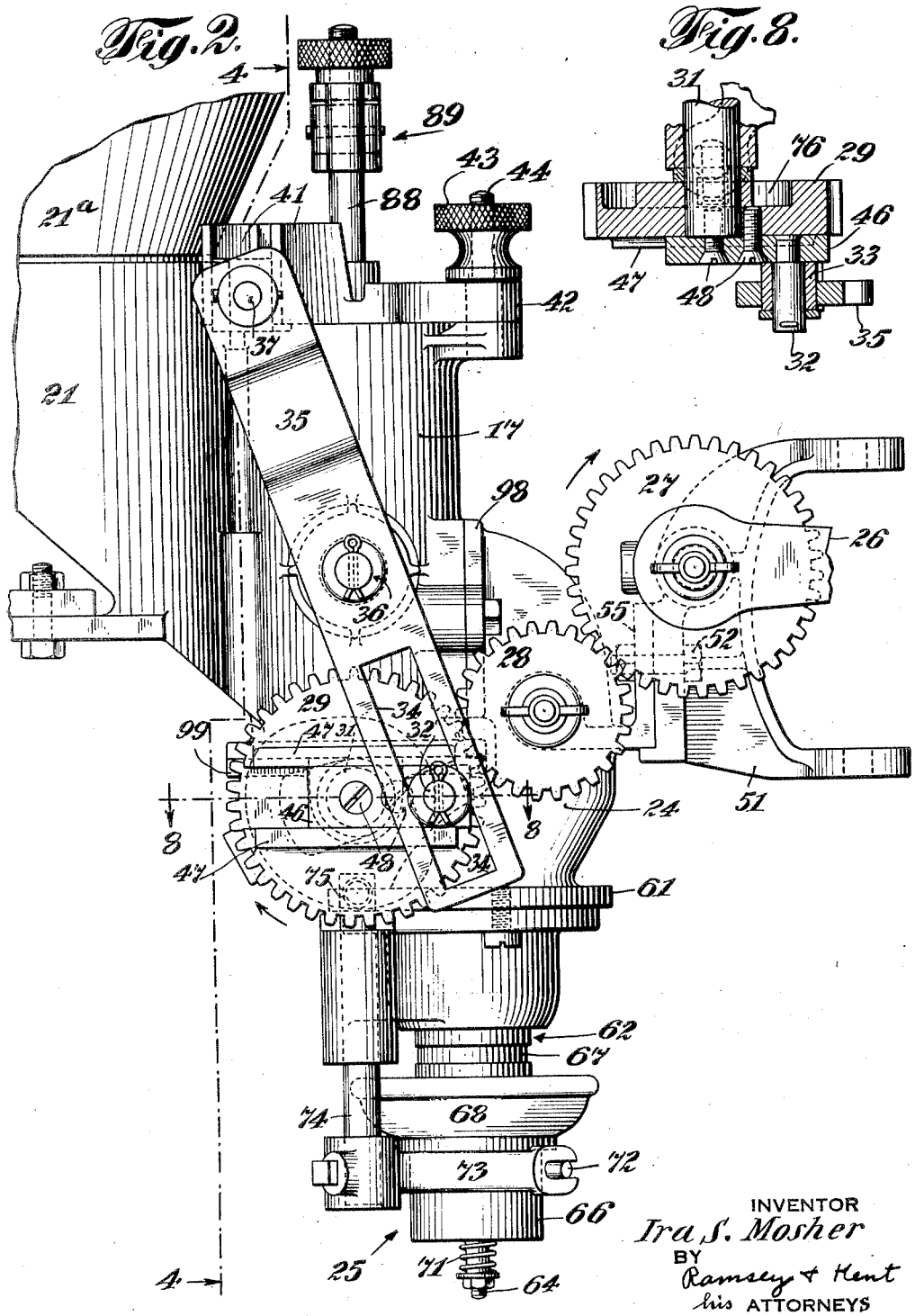

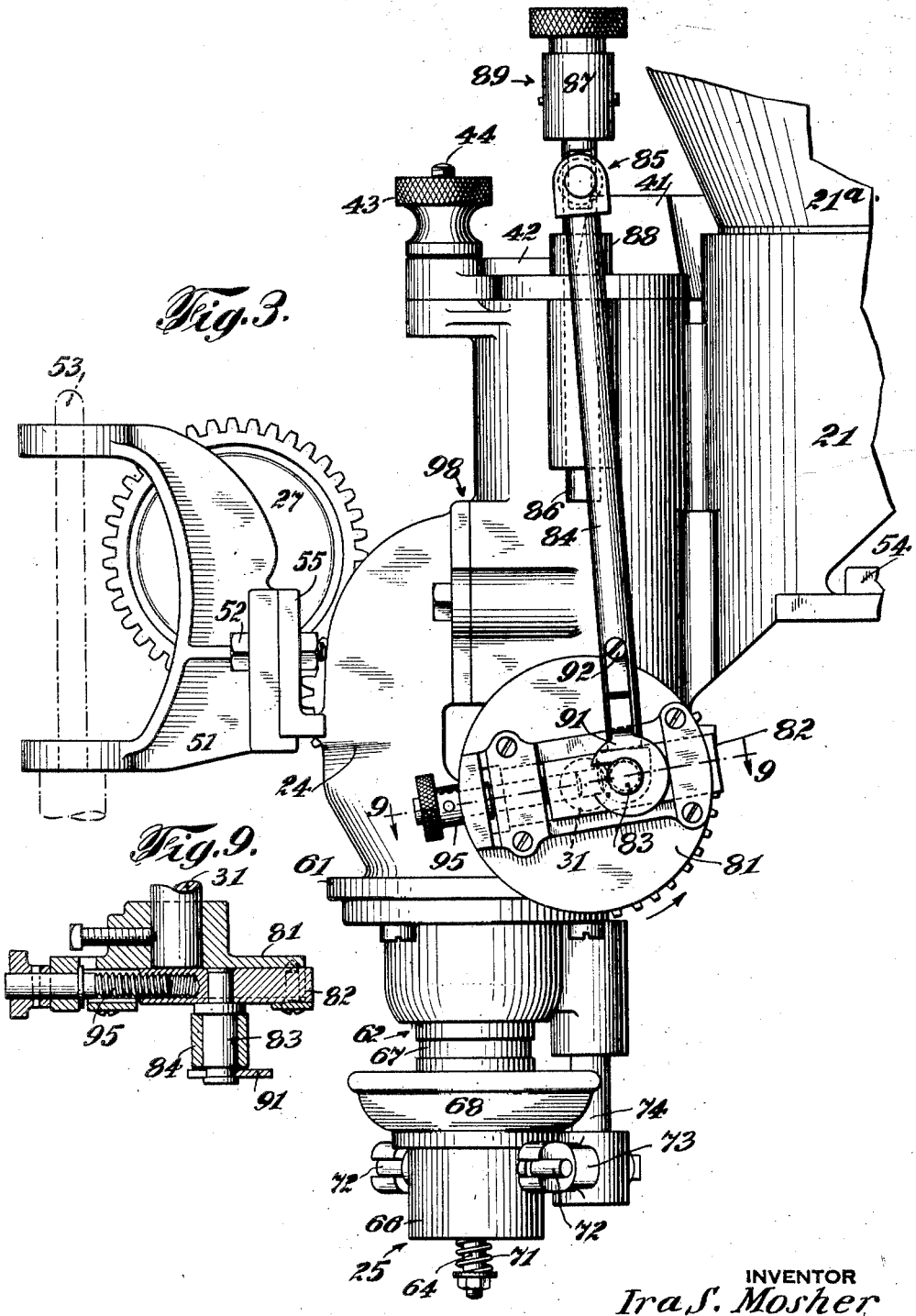

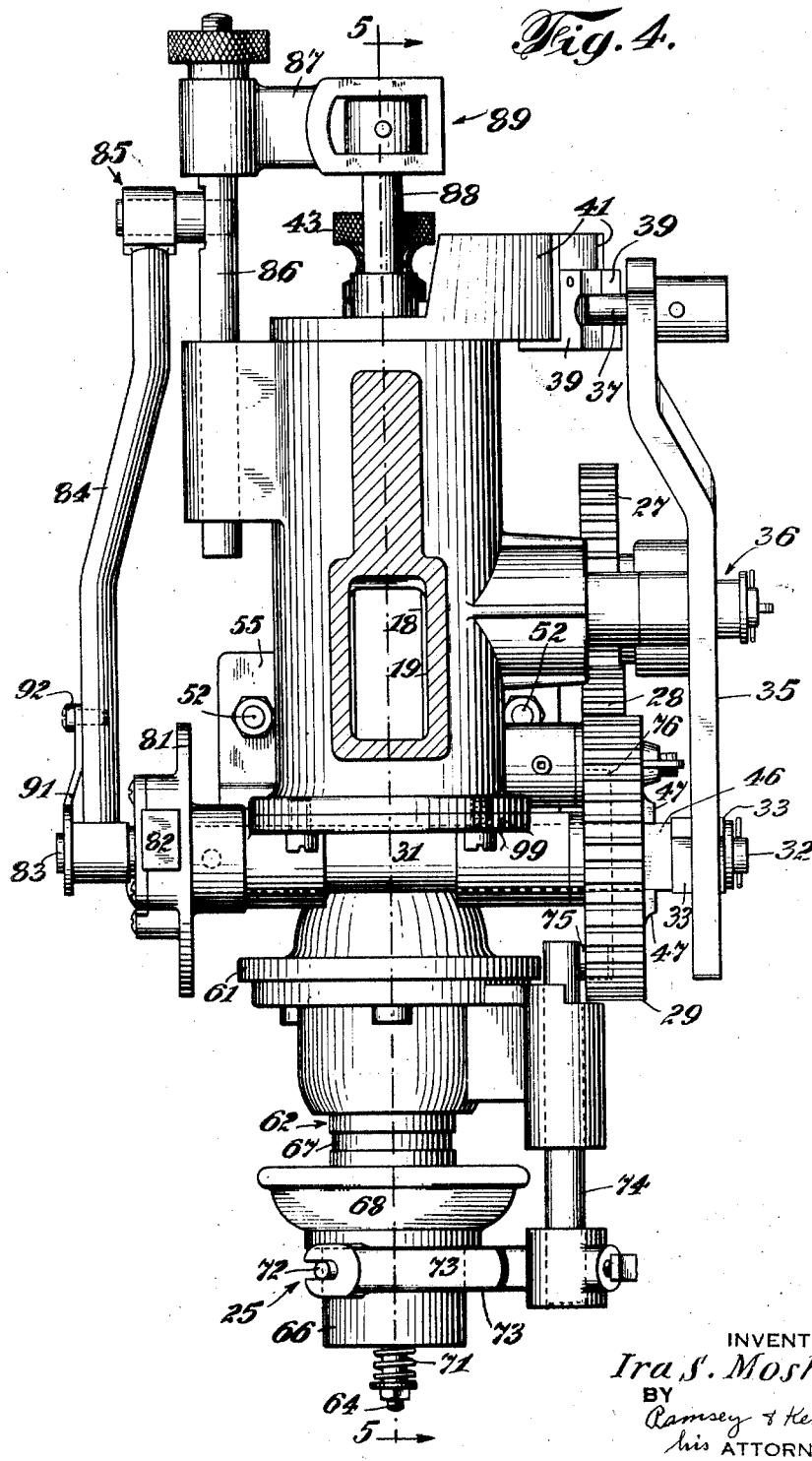

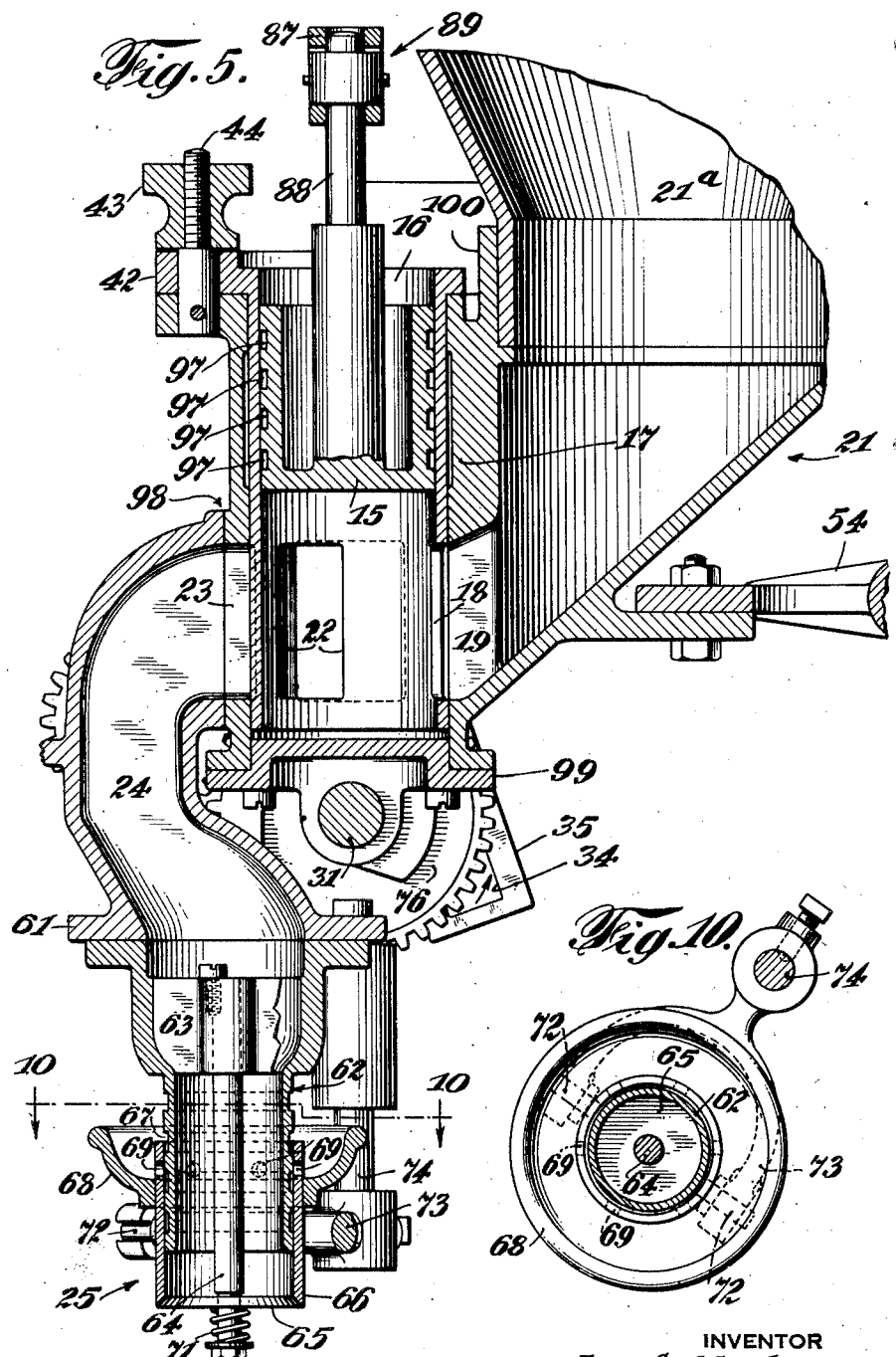

1,856,042

UNITED STATES PATENT OFFICE

IRA S. MOSHER, OF CHICAGO, ILLINOIS, ASSIGNOR, BY MESNE ASSIGNMENTS, TO JOE LOWE CORPORATION, OF BROOKLYN, NEW YORK, A CORPORATION OF DELAWARE

DOUGH CUTTER

Application filed March 5, 1931. Serial No. 520,183.

This invention relates to mechanisms for making formations of plastic material. It is particularly applicable to the making of doughnuts, and hence, it will be disclosed in that connection. For convenience the entire device will be referred to as a "dough cutter".

Various forms of mechanisms have been proposed for shaping dough into doughnuts. It is usual to place the dough in a hopper from which it is fed to a shaping and severing die which forms doughnuts one after another. In many of the prior art dough cutters the dough is fed by means of a feed screw or other means which engages the dough and pushes it forward. At the present time doughnuts are made commercially from prepared flour, which forms a dough that is greatly toughened by any working, manipulation, or agitation, once the dough has been mixed. Accordingly, feed screws and other such means which have been used to advance the dough from the hopper to the dough cutter are very undesirable from the standpoint of the tastiness of the doughnut. Such types of mechanisms are also undesirable from the standpoint of ease of cleaning of the mechanism.

An important object of the invention is to provide a "dough cutter" which feeds the dough with a minimum amount of working or manipulation of the dough.

Another object of the invention is to provide a simple, reliable "dough cutter" suitable for present day quantity production of doughnuts.

Other objects of the invention are to provide a "dough cutter" which can be readily adjusted to produce doughnuts of different sizes, which will accurately maintain the doughnut size for which it is adjusted, and which can be easily cleaned.

In the form of the invention disclosed, the dough is placed within a hopper, from which it is sucked, a charge at a time, by a reciprocating measuring piston working in a loading or measuring chamber. After a charge of dough has been drawn to the measuring chamber, it is forced by the piston to a shaping and severing die which forms a doughnut and severs it from the column of dough. The admission of dough to the measuring chamber and the discharge of it therefrom is controlled by an oscillatory sleeve valve which surrounds the measuring piston and has one port adapted to communicate with the dough hopper and another port adapted to communicate with a conduit leading to the dough forming and severing die.

Fig. 1 is a plan view of the form of mechanism selected for illustrating the invention.

Fig. 2 is an elevation looking from the right of Fig. 1.

Fig. 3 is an elevation looking from the left of Fig. 1.

Fig. 4 is a vertical section taken approximately on line 4—4 of Fig. 2.

Fig. 5 is a vertical section taken approximately on the line 5—5 of Fig. 4, the parts being shown near the end of the intake stroke of the measuring piston.

Fig. 6 is a vertical section similar to Fig. 5, but showing the parts soon after the beginning of the discharge stroke of the measuring piston.

Fig. 7 is a vertical detail section taken approximately on line 7—7 of Fig. 1, showing the driving connection to the oscillatory sleeve valve.

Fig. 8 is a horizontal detail section taken on the line 8—8 of Fig. 2.

Fig. 9 is a detail section taken on the line 9—9 of Fig. 3.

Fig. 10 is a horizontal detail section taken on the line 10—10 of Fig. 5.

Fig. 11 is a horizontal detail section taken on the line 11—11 of Fig. 6, showing the position of the oscillatory valve during the discharge stroke of the measuring piston.

General organization

Reference will now be had primarily to Figs. 5 and 6. A piston 15 is adapted to be reciprocated within an oscillatory sleeve valve 16, positioned in a cylinder 17. While piston 15 is rising, sleeve valve 16 is in the position shown in Fig. 5, in which the valve port 18 registers with passageway 19 leading from the bottom of hopper 21. The dough which is placed in hopper 21 is mixed to a rather soft consistency and since the rising of the piston tends to produce a vacuum within the sleeve valve 16, a charge of dough is sucked into the measuring chamber beneath the piston 15. At or near the upper limit of travel of the piston the sleeve valve 16 is quickly oscillated to bring it into the position shown in Fig. 6. In such position communication from the measuring chamber to the hopper 21 is closed off and valve port 22 registers with port 23 leading to discharge conduit 24. Assuming that the mechanism has already been operated for a few cycles so that conduit 24 is full of dough, the downward movement of piston 15 results in the delivery to die mechanism 25 of a charge of dough equal to the volume of the dough measuring chamber. The die 25 operates in a manner which will be described later to form an annular mass of dough and sever it from the dough in the conduit 24 to thereby produce an annular doughnut. Of course, the oscillatory valve 16, measuring piston 15, and the forming and severing die 25 are all coordinated and actuated in timed relation with one another.

Mounting and drive

The mechanism may be hand driven by means of a crank 26 (Figs. 1 and 2) which rotates gear 27, on a stub shaft projecting from bracket 51, bolted to the frame of the dough cutter by bolts 52. The bracket 51 is adapted to support the whole mechanism on a pintle 53 (Fig. 3), and when so supported, the dough cutter can be swung into position over the cooking vat, or out of the way. In hand operation the operator graps handle 54 (Fig. 1) with his left hand and turns crank 26 with his right hand. However, the dough cutter will ordinarily be used in connection with an automatic machine for frying the doughnuts; and in such case, the bracket 51 and associated parts are removed and the cutter is bolted to a support on the cooking machine by means of bracket 55. A driven gear on the cooking machine is then meshed with gear 28 to continuously drive the mechanism. Of course, clutch mechanism is preferably provided in conjunction with the cooking machine gear meshed with gear 28 so that the dough cutter can be stopped and started at will without shutting down the cooking machine.

Oscillatory sleeve valve

The mechanism for actuating the sleeve valve 16 will now be described, reference being had primarily to Figs. 2, 4, 7 and 8. With gear 28 continuously driven, continuous rotation will be imparted to gear 29, which is keyed to one end of shaft 31. Eccentrically mounted upon the outer face of gear 29 is a pin 32 provided with a slide block 33 (Figs. 1 and 4) which cooperates with a slot 34 in the lower end of an oscillatory line 35 pivoted to the frame of the mechanism at 36. Accordingly, as the gear 29 rotates, the upper end of lever 35 will be cyclically swung back and forth. Attached to the upper end of the lever 35 is a pin 37 to the inner end of which is secured a ball 38 (Fig. 7). The ball 38 is embraced by two recessed blocks 39—39 (Figs. 1 and 7); and the outer faces of the blocks are flat and are slidable against the surfaces of parallel plates 41—41 carried by the sleeve valve 16. Thus, as the upper end of lever 35 moves back and forth, the sleeve valve 16 is oscillated to control the admission to and discharge of dough from the measuring chamber.

The upper end of the sleeve valve 16 is provided with an arcuately slotted flange 42 (Figs. 1 and 2) which moves beneath a nut 43 on a stud 44 that passes through the slot of the flange 42. The purpose of this is to prevent the sleeve valve from being moved upwardly, through the frictional engagement of the piston 15, during the upward stroke of the piston. However, by removing the nut 43 and disconnecting arm 87, both piston 15 and the sleeve valve 16 can be lifted out for the purpose of cleaning or otherwise.

Referring to Figs. 2 and 8 it will be seen that the pin 32 is riveted to a plate 46 located between chordal guideways 47—47 integral with the gear 29. This enables the plate 46 to be shifted radially to change the eccentricity of pin 32; but once the desired position of the pin 32 has been determined for any given set-up, the plate 46 is preferably stationarily fixed to the gear 29 by means of one or more screws 48.

Shaping and severing die

The severing die and its operating mechanism will now be described, reference being had primarily to Figs. 5, 6 and 8. This die mechanism is made as a unit, which unit may be bolted to flange 61 at the lower end of the dough discharge conduit 24. A generally tubular stationary housing 62 is bridged at its upper end by a cross piece 63 from which depends a rod 64 that supports a disc-like element 65 shaped like the head of a poppet valve. Surrounding housing 62 is a reciprocating severing sleeve 66 having its lower end beveled in the form of a valve seat to cooperate with the beveled edge of disc 65. When the parts are in the position shown in Fig. 6, dough is flowing out over the valve disc 65; and then, at the culmination of the feeding of the charge of dough to the die, the sleeve 66 is quickly moved into the position shown in Fig. 5, thus severing the extruded dough from the column of dough moving down conduit 24 and also sealing the lower end of the conduit.

Preferably the outer surface of housing 62 is provided with a plurality of grooves 67, these grooves having the effect of opposing the tendency of the dough to work up between the housing 62 and the sleeve 66. The sleeve 66 may also be provided with an annular cup 68 in which lard or other fat used in frying doughnuts may be placed, the fat gradually melting and flowing through openings 69 to lubricate the sleeve 66. Preferably the disc 65 is yieldingly positioned on the end of rod 64, as by means of springs 71, so that the disc can yield slightly as the sleeve 66 closes against it. This construction automatically compensates for wear of the severing surfaces and makes it possible to positively drive the sleeve 66 without resorting to very accurate proportioning of the parts.

Projecting laterally from the sleeve 66 are pins 72, 72 engaged by the forked ends of a U-shaped arm 73 attached to the lower end of rod 74. The upper end of rod 74 is provided with a cam follower 75 cooperating with a cam groove 76 formed in the back of gear 29. This cam is shaped to reciprocate the sleeve 66 in timed relation with the movement of other parts of the apparatus, the cam preferably being shaped to produce quick opening and quick closing of the die at appropriate times during the cycle.

*Loading mechanism or measuring chamber*

The driving connection for the measuring piston 15 will now be described, reference being had primarily to Figs. 3, 4, 6 and 9. The left-hand end (Fig. 4) of shaft 31 is provided with a dog plate 81 on which is suitably mounted, as shown, a slide 82 carrying an eccentric pin 83. Eccentric pin 83 is embraced by the lower end of connecting rod 84, the upper end of which is pivoted at 85 to a vertically slidable rod 86. Suitably secured to the upper end of rod 86 is an arm 87 to which piston rod 88 is suitably attached, as shown at 89. It is obvious that as the shaft 31 rotates, eccentric pin 83 will travel in a circle, and piston 15 will be reciprocated vertically. Any suitable means may be used to retain connecting rod 84 in engagement with its pivots at 85 and 83, the means shown being clip 91, which is secured to the connecting rod 84 at 92 and engages under head 92 on the end of pin 93, as shown in Figs. 3 and 9. As shown more particularly in Fig. 9, the slide 82 may be adjusted crosswise of the plate 81 by means of an adjustment screw 95. It will be apparent that the adjustment of slide 82 changes the eccentricity of pin 83 and thereby varies the stroke imparted to piston 15. This adjustment provides for changing the size of the charge of dough delivered to the die 25 at each stroke of the piston to thereby set the apparatus to make larger or smaller doughnuts. As shown in Figs. 5 and 6, the piston 15 preferably is provided with a plurality of unpacked grooves 97 which aid in making an effective seal between the piston and the sleeve 16, and yet enable the piston to be easily cleaned.

*Miscellaneous features*

The apparatus is so made that it can be readily dismantled for cleaning, as has heretofore been pointed out in part. As previously referred to, the severing die 25 is made as a unit which is detachable at 61. This makes it possible to readily substitute a die of different size or to substitute a die for making a different type of doughnuts, e. g., stick doughnuts. Discharge conduit 24 is detachable from the cylinder 17, as shown at 98 (Fig. 3). The bottom of cylinder 17 is removable, as shown at 99 (Fig. 5). The hopper, designated as a whole by 21, has an upper funnel shaped section 21ᵃ which makes a friction fit with flange 100 and is readily removable.

The invention may be embodied in forms other than the one specifically disclosed, and hence the foregoing disclosure is merely illustrative in compliance with the patent statutes and is not to be considered as limiting.

I claim:

1. Dough handling apparatus comprising a cylinder having an intake port and a discharge port, said cylinder having a detachable cylinder head; a dough hopper communicating with said intake port; a conduit having one end communicating with said discharge port, said conduit being detachably secured to the cylinder; dough shaping and severing mechanism detachably secured to the other end of said conduit; valve means operable to selectively open and close said ports; and a reciprocatory piston operable to suck dough from the hopper and discharge it through the conduit to said shaping and severing mechanism.

2. Dough shaping and severing mechanism comprising a support for a valve disc, a substantially stationary valve disc on said support, means to yieldingly position said valve disc, a valve sleeve positioned to cooperate with said disc, and means to reciprocate said valve sleeve.

3. Dough shaping and severing mechanism comprising a depending support for a valve disc having means to limit upward movement of a valve disc thereon, a valve disc carried by said support, a spring yieldingly urging said disc against said limiting means, a valve sleeve cooperating with said valve disc, and means to reciprocate said valve sleeve.

4. Mechanism for forming and severing dough for annular doughnuts comprising a valve disc, a valve sleeve cooperating with said disc, means to positively and cyclically actuate one of said elements to alternately bring the disc and sleeve together and then separate them a predetermined distance, and means to effect a yielding engagement between the disc and sleeve when they are brought together.

IRA S. MOSHER.